United States Patent [19]
Fujita et al.

[11] 3,962,986
[45] June 15, 1976

[54] DISPLAY MILEAGE REMINDER DEVICE FOR VEHICLE PARTS SERVICING

[75] Inventors: Haruyasu Fujita, Higashi-Ohizumi; Fumio Muroya, Chofu, both of Japan

[73] Assignee: Honda Giken Kogyo Kabushiki Kaisha, Tokyo, Japan

[22] Filed: Aug. 15, 1975

[21] Appl. No.: 606,404

[30] Foreign Application Priority Data
Aug. 15, 1974  Japan.............................. 49-97746
Aug. 15, 1974  Japan.............................. 49-97747

[52] U.S. Cl............................ 116/114 W; 235/95 R
[51] Int. Cl.²................. G01C 22/00; G01D 21/00
[58] Field of Search...................... 116/114 W, 73; 235/95 R, 97

[56] References Cited
UNITED STATES PATENTS

| | | | |
|---|---|---|---|
| 1,686,854 | 10/1928 | Hammond, Jr. et al. | 116/114 W |
| 1,948,427 | 2/1934 | Moecker | 116/114 W X |
| 2,273,848 | 2/1942 | Ely et al. | 235/95 X |
| 3,598,309 | 8/1971 | Engler | 116/114 W |
| 3,785,551 | 1/1974 | Regan | 235/97 X |

*Primary Examiner*—Richard C. Queisser
*Assistant Examiner*—Daniel M. Yasich
*Attorney, Agent, or Firm*—Haseltine, Lake & Waters

[57] ABSTRACT

A set of display wheels are jointly driven from a conventional vehicle odometer so as to complete a revolution each time the vehicle travels a predetermined distance of, for example, 10,000 kilometers. Each display wheel has one or more warning zones on its circumference such that each warning zone, when turned to a display position for observation by the vehicle driver, indicates the fact that some particular part of the vehicle is in need of inspection or servicing. The display device further comprises means for automatically locking any one of the display wheels against rotation when the warning zone thereon turns to the display position, and means for unlocking and resetting the display wheel after the necessary inspection or servicing, as by the depression of a push button.

10 Claims, 8 Drawing Figures

DISPLAY MILEAGE REMINDER DEVICE FOR VEHICLE PARTS SERVICING

BACKGROUND OF THE INVENTION

This invention relates to a display device for use on and in conjunction with vehicles of various descriptions. More specifically, the invention deals with a display device cooperating with the usual vehicle odometer to give visual indications as to specific items of inspection and/or servicing which must be performed on various parts of the vehicle as the same travels prescribed distances.

There are various items of maintenance to which a vehicle driver or owner must attend periodically to keep the vehicle in good repair and working order. Such items of vehicular maintenance include the change of engine oil, the tuning of the engine, brakes and so forth, and the change of tires and other parts. Usually the vehicle manufacturer specifies the distances of vehicle travel at which particular maintenance items should be executed. Oblivious of the specified distances, however, the vehicle driver often fails to perform, or to have performed by servicemen, the necessary inspection or servicing of the vehicle at due times. This can result not only in a trouble in some working part of the vehicle but, worse yet, in a serious traffic accident.

There has been proposed a device which is driven from the usual odometer of the vehicle to indicate specific maintenance items to be performed at various distances traversed by the vehicle. This prior art device, however, has no means for locking the indications made, so that the indications disappear as the travel distance of the vehicle increases, even though the driver has not carried the indicated maintenance items into effect.

SUMMARY OF THE INVENTION

It is an object of this invention to provide an improved display device for reminding a vehicle driver of specific items of inspection and/or servicing to be performed on various vehicular parts exactly when the vehicle travels prescribed distances, thereby contributing to driving safety.

Another object of the invention is to provide a display device of the above defined general character, wherein the indications made as to specific items of maintenance are automatically locked in position and held locked until the operator resets the device upon completion of the indicated maintenance items, so that the device is capable of positively informing the driver of due times for various checking and/or servicing operations.

A further object of the invention is to provide a display device such that, in event the vehicle owner has completed the servicing of some part before the vehicle runs the prescribed distance, he can reset the device so that the same may correctly indicate the maintenance item when the vehicle covers the prescribed distance again.

A further object of the invention is to provide a display device of simple and compact construction which can be easily built in, for example, the dashboard of the vehicle without any undue space requirement.

With these and other objects in view this invention provides a display device combined with a vehicle odometer of well known construction which gives a direct reading of the distance traveled by the vehicle. The display device includes at least one display wheel constituted of an inner member and outer member. The inner member of the display wheel is driven from the odometer so as to complete a revolution each time the vehicle runs a predetermined distance, and clutch means normally connects the inner member to the outer member to permit the latter to rotate with the former. The display wheel outer member has at its circumferential point a warning zone which, when turned to a predetermined display position for observation by the vehicle driver, serves to warn the fact that some particular part of the vehicle is in need of inspection or servicing.

The display device according to the invention further comprises locking means for automatically restraining the display wheel outer member from rotation when the warning zone thereon turns to the display position, and reset means for manually unlocking the outer member to permit the same to recommence rotation with the inner member. The aforesaid clutch means is effective to disconnect the outer member from the inner member when the former is locked against rotation as above.

It should be noted that the display device continues exhibiting the warning zone until the reset means is actuated manually after the required inspection or servicing. In this manner the vehicle driver cannot possibly miss the indications made by the device, so that the noted disadvantage of the prior art is thoroughly overcome.

The features which are believed to be novel and characteristic of this invention are set forth in particular in the appended claims. The invention itself, however, both as to its construction and mode of operation, together with the additional objects and advantages thereof, will become apparent in the course of the following description, which is to be read in connection with the accompanying drawings in which like reference characters denote corresponding parts of the several views.

DESCRIPTION OF THE PREFERRED EMBODIMENTS

Figure 1:
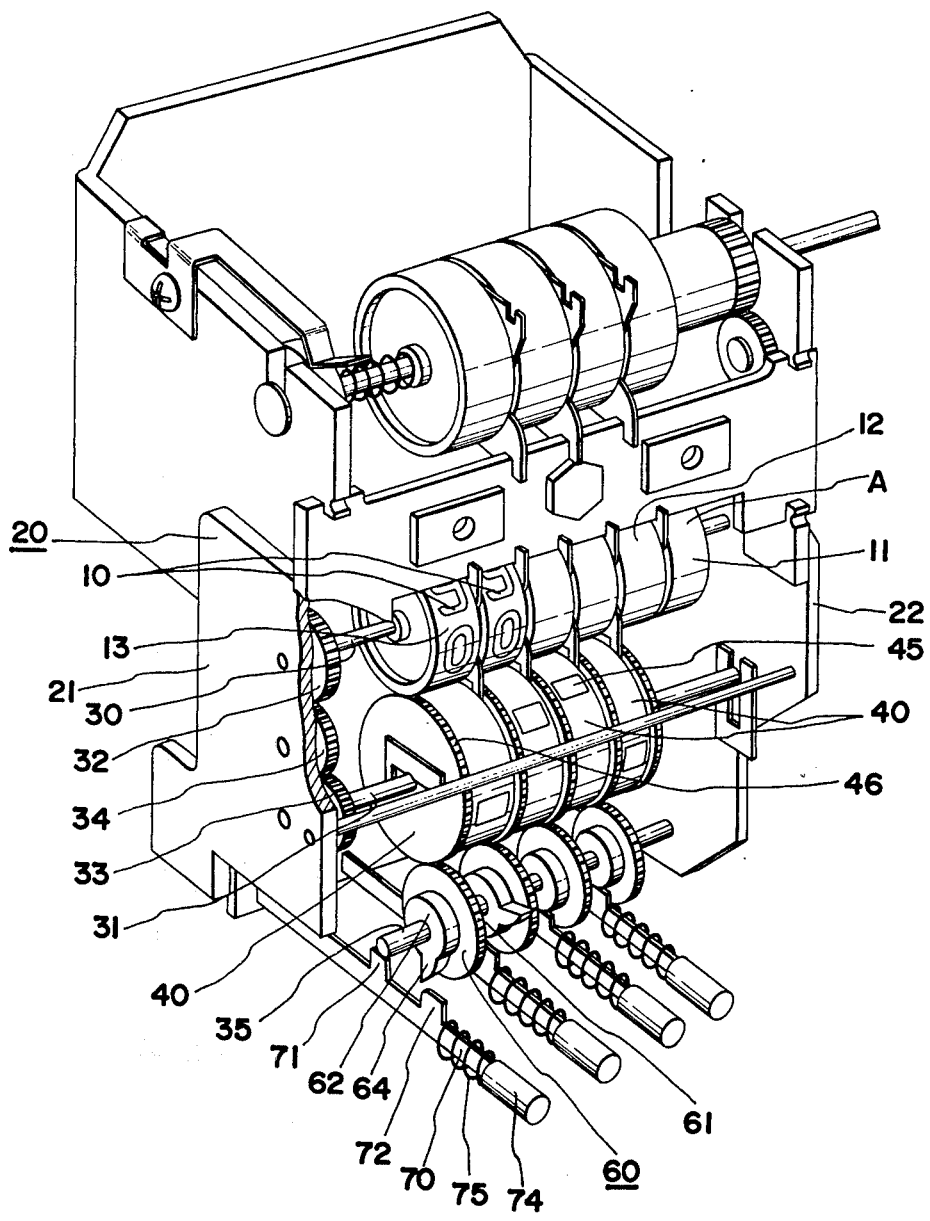
FIG. 1 is a perspective view, partly broken away, of the display device constructed by way of a preferred embodiment of this invention, the view also showing a conventional vehicle odometer for combined use with the display device.

With reference to FIG. 1 there is shown at A a conventional vehicle odometer which is driven, for example, from the usual speedometer shaft and which registers the distance traveled by the vehicle, either in kilometers or in miles. The odometer A comprises a set of digit wheels 10 arranged coaxially and each having digits 0 to 9 marked on its circumference. When the particular digit wheel 11 that represents the least order of digits completes a revolution, it turns the digit wheel 12 next to the left one-tenth of a turn, thus summing up the kilometers or miles traversed.

The digit wheels 10 are all mounted on a shaft 30 which is rotatably journaled at both ends in a pair of opposed side walls 21 and 22 of a casing 10. It should be noted that this shaft 30 rotates in step with only some preselected digit wheel which represents a convenient digit order, for example, the order of thousands. All but this preselected one of the digit wheels 10 are loosely mounted on the rotatable shaft 30.

Another rotatable shaft 31 is arranged under the digit wheel shaft 30 in parallel relationship thereto. A drive gear 32 fixedly mounted on one end of the digit wheel shaft 30 meshes with a driven gear 33 on the second shaft 31 via an intermediate gear 34. This train of gears 32, 33 and 34 connects the shaft 30 to the shaft 31 at a gear ratio of 1:1, so that the latter shaft also rotates in step with the preselected one of the digit wheels 10.

At least one display wheel 40 is mounted on the second shaft 31 (hereinafter referred to as the display wheel shaft) in the manner later described. In practice, however, a plurality of such display wheels may be arranged coaxially on the display wheel shaft 31 as shown, depending upon the number of items to be checked and/or serviced.

Figure 2:
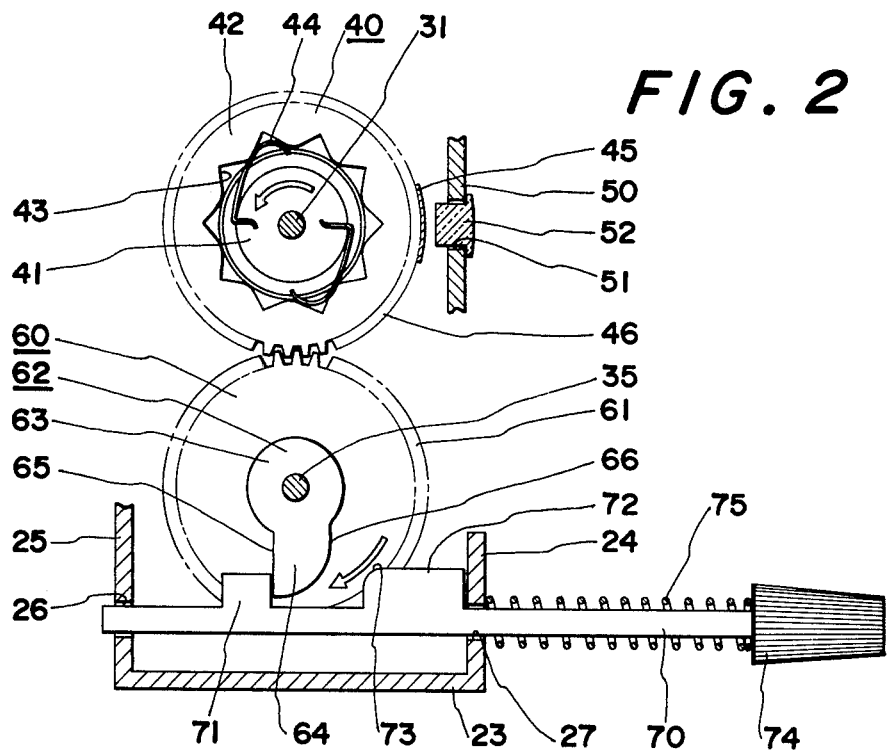
FIG. 2 is an enlarged, fragmentary vertical sectional view showing some essential parts of the display device of FIG. 1.

As illustrated in greater detail in FIG. 2, each display wheel 40 comprises an inner member 41 fixedly mounted on the display wheel shaft 31 for simultaneous rotation therewith, and an outer member 42 loosely fitted over the inner member. Arranged between the inner and outer members 41 and 42 of each display wheel is a clutch means including one or more spring elements 44 each affixed at one end to the inner member 41. The display wheel outer member 42 has a series of notches 43 on its inside edge, such that the free end of each spring element 44 is normally releasably engaged in one of the notches to cause the outer member to rotate with the inner member and, therefore, with the display wheel shaft 31. When the display wheel outer member 42 is locked against rotation by means hereinafter set forth, however, the spring elements 44 of the clutch means will slide over the notches to permit the inner member 41 to rotate with the display wheel shaft 31, independently of the outer member.

Each display wheel 40 has at least one warning zone 45 at a prescribed point on the circumference of its outer member 42. In one form of construction the warning zone 45 takes the form of some brightly colored panel affixed to the display wheel outer member as by the use of an adhesive. If desired, the panel may be marked with suitable indication suggesting a particular item of vehicular maintenance to be performed.

The display wheels 40 are arranged, for example, behind the dashboard 50 of the vehicle, and a row of viewing windows 51 are formed through the dashboard for the respective display wheels. A fisheye lens 52 is shown to be fitted in each viewing window 51 so that the vehicle driver may readily notice the indication made by each display wheel 40.

Thus, as the display wheel shaft 31 rotates in accordance with the distance traveled by the vehicle, the warning zone 45 on the particular display wheel 40 of FIG. 2 will turn to a predetermined display position opposite the corresponding viewing window 51 upon each complete revolution of that display wheel. If the display wheel shaft 31 rotates in step with the "thousands" digit wheel as aforesaid, then the warning zone 45 on the particular display wheel will turn to the display position each time the vehicle runs 10,000 kilometers or miles, thereby warning the driver that, for instance, his vehicle tires are in need of change.

The display wheel outer members 42 are integrally provided with sets of gear teeth 46 that are in constant mesh with teeth 61 on respective locking gears 60 rotatably mounted on a common shaft 35 (hereinafter referred to as the locking gear shaft). The display wheel outer members 42 and the corresponding locking gears 60 are thus interconnected at a gear ratio of 1:1. These locking gears, rotatable independently of each other, are each intended to lock the outer member 42 of the corresponding display wheel 40 against rotation when the warning zone 45 thereon occupies the display position opposite the viewing window 51.

Each locking gear 60 is formed integral with a portion generally labeled 62 in FIG. 2. This portion consists of a boss 63 formed centrally of the locking gear and a catch 64 extending radially outwardly therefrom. The catch 64 has a straight edge 65 and rounded edge 66 on its opposite sides.

Arranged under the portion 62 of each locking gear 60 is a reset rod 70 which is to be actuated manually to unlock and reset the corresponding display wheel 40. Each reset rod 70 is supported by a supporting frame 23 under the casing 20 for back-and-forth motion in its longitudinal direction. The supporting frame 23 includes front and rear frame members 24 and 25, and the reset rod 70 has its tip slidably received in an opening 26 of the rear frame member 25 and projects forwardly of the front frame member 24 by slidably extending through its opening 27.

Each reset rod 70 has formed thereon a stop 71 adjacent its rear end and a trip 72 on the forward side of the stop. The trip 72 has a rounded edge 73 for sliding contact with the rounded edge 66 of the corresponding catch 64. The reset rod 70 terminates at its front end in a push button 74, and a return spring in the form of a helical compression spring 75 is installed between the push button 74 and the front member 24 of the supporting frame 23.

Each reset rod 70 is therefore normally held in the position of FIG. 2, in which the stop 71 is capable of engaging the catch 64 on the corresponding locking gear 60. Upon depression of the push button 74 against the force of the return spring 75, the reset rod 70 will travel rearwardly to trip the catch 64 that has been engaged by the stop 71, as later described in more detail.

It is noteworthy that the angular position of the catch 64 on each locking gear 60 is so determined that when the catch becomes engaged by the stop 71 on the corresponding reset rod 70, the locking gear will arrest the rotation of the corresponding display wheel outer member 42 at its exact angular position where the warning zone 45 thereon occupies the display position.

Therefore, if the display wheel outer member 42 has two or more warning zones thereon, then as many catches must be provided on the locking gear 60 at suitable angular spacings.

In operation, the rotation of the digit wheel shaft 30 is transmitted to the display wheel shaft 31 via the train of gears 32 to 34, so that the display wheels 40 jointly rotate in synchronism with the preselected digit wheel. The rotation of the display wheels 40 is further transmitted to the locking gears 60 via the intermeshing gear teeth 46 and 61, so that the locking gears as well as their detents 64 also rotate in synchronism with the preselected digit wheel.

When the warning zone 45 on any of the display wheels 40 turns to the display position opposite the viewing window 51, the outer member 42 of this particular display wheel becomes locked against rotation by the corresponding locking wheel 60 becomes then the straight edge 64 of its catch 54 abuts against the stop 71 on the reset rod 70. The spring elements 44 of the clutch means disconnect the locked outer member 42 from the inner member 41, sliding over the notches 43 owing to their own resiliency with the continued rotation of the inner member. All the other display wheels 40 are therefore free to rotate with the display wheel shaft 31 while the outer member 42 of the display wheel in question is thus restrained from rotation.

Figure 3:
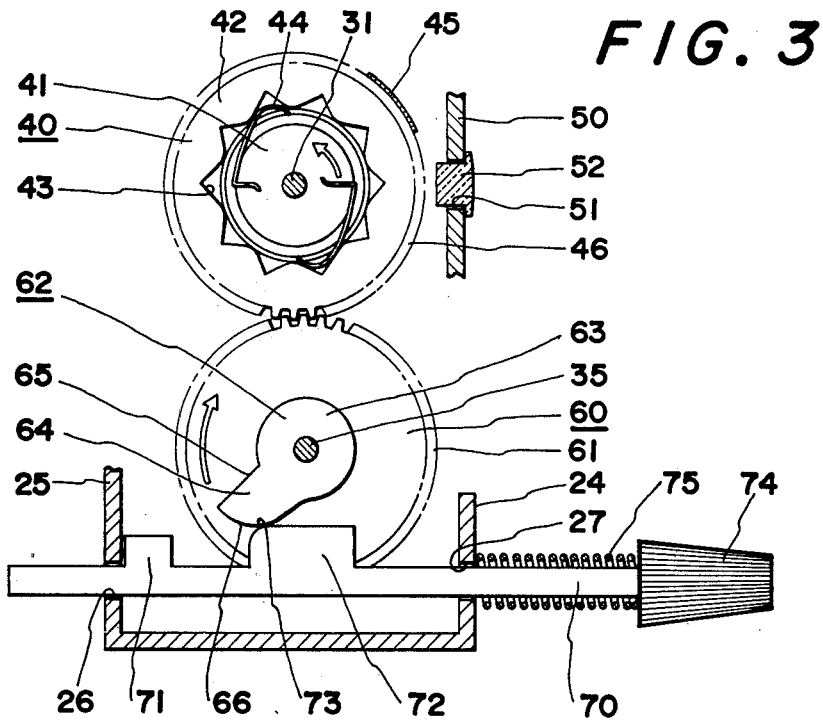
FIG. 3 is a view similar to FIG. 2 but explanatory of the resetting operation of the device.

After forming the necessary checking or servicing operation as directed by the warning zone 45 now in its display position, the operator may depress the push button 74 located just under the viewing window 51 through which the warning zone is being exhibited. The reset rod 70 of the depressed push button 74 will then travel rearwardly until the stop 71 thereon abuts against the rear frame member 25, as shown in FIG. 3. The stop 71 thus moves out of the path of travel of the catch 64 that has been engaged thereby, and almost concurrently the rounded edge 73 of the trip 72 moves into pushing contact with the rounded edge 66 of the catch to cause the whole locking gear to rotate with a predetermined angle in the arrow marked direction.

This forced rotation of the locking gear 60 is imparted to the display wheel outer member 42 in mesh therewith, thereby causing the same to rotate through the same angle relative to its inner member 41. The warning zone 45 on the outer member 42 is now returned to a predetermined starting position shown in FIG. 3.

With the display wheel 40 under consideration reset in the above described manner, the push button 74 may be released to permit the reset rod 70 to return to the initial position of FIG. 2 by the force of the return spring 75. The catch 64, of course, is now located on the left hand side, as viewed in FIG. 2, of the stop 71. The display wheel will then resume rotation in step with the digit wheel shaft 30 and will continue rotation until the vehicle covers the prescribed distance again.

It is possible that the warning zone 45 on two or more display wheels 40 simultaneously turn to the display positions, as will be understood from a consideration of FIG. 1. The outer members 42 of these display wheels will then be all locked against rotation by the respective locking gears 60 corresponding thereto, and the display wheels can be reset as the operator subsequently depresses the two or more corresponding push buttons 74 after the necessary checking and/or servicing operations.

In the use of this display device one of the display wheels 40 may be used for indication, for example, of time due for the change of engine oil. Assume that this change of engine oil is necessary each time the vehicle runs 2,000 kilometers, but that the digit wheel shaft 30 is coupled to the "thousands" digit wheel, causing the display wheels 40 to complete a revolution with each 10,000 kilometer run of the vehicle. In that case five warning zones 45 may be provided on the one display wheel 40 at constant angular spacings, and five catches 64 may be formed at constant angular spacings on the locking gear 60 corresponding to the display wheel. The display wheel will then make the necessary indication with every 2,000 kilometer vehicle run.

Figure 4:
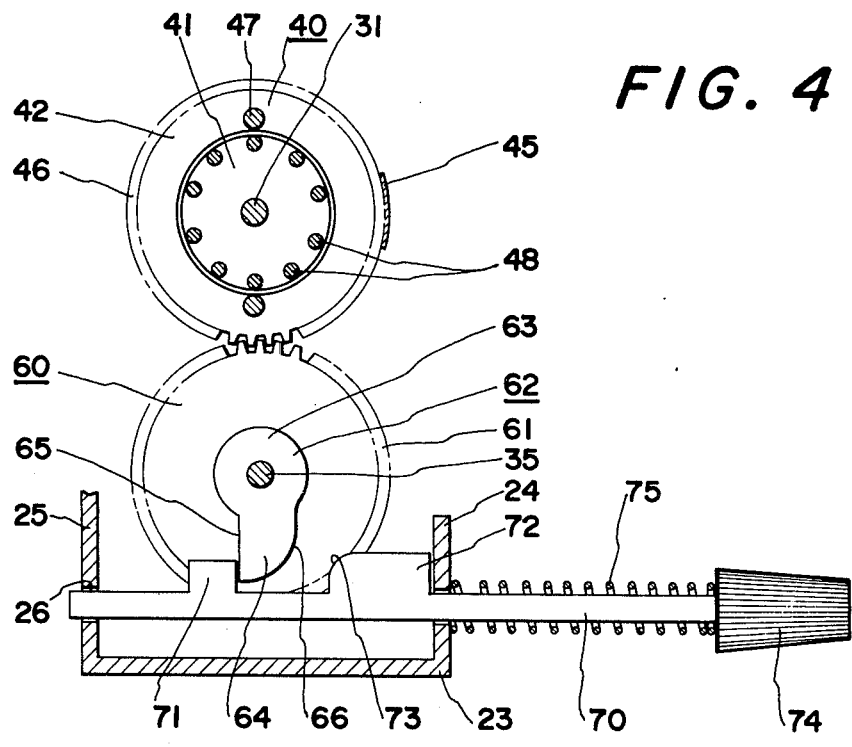
FIG. 4 is a view also similar to FIG. 2 but showing an alternative form of clutch means between the inner and outer members of each display wheel in the display device of FIG. 1.

FIG. 4 illustrates an alternative form of the clutch means between the inner and outer members 41 and 42 of each display wheel 40. The alternative clutch means comprises one or more magnets 47 embedded in the display wheel outer member 42 and a multiplicity of pieces 48 of iron or like magnetic material embedded in the display wheel inner member 41 with constant circumferential spacings in opposed relationship to the magnets 47. Since the magnets 47 attract the adjacent magnetic pieces 48, the outer member 42 normally rotates with the inner member 41 or with the display wheel shaft 40.

As the catch 64 on the corresponding locking wheel 60 becomes engaged by the stop 71 on the reset rod 70, the display wheel outer member 42 is locked against rotation in the above described manner. Since this outer member has been only magnetically connected to the inner member 41, however, the latter is free to rotate with the display wheel shaft 40 in spite of the magnetic attraction exerted on its pieces 48 by the magnets 47. The other display wheels are therefore allowed to rotate while the outer member 42 of the display wheel in question is restrained from rotation. This outer member, of course, recommences rotation with the inner member as the operator subsequently depresses the corresponding push button 74 after the required inspection or servicing.

Figure 6:
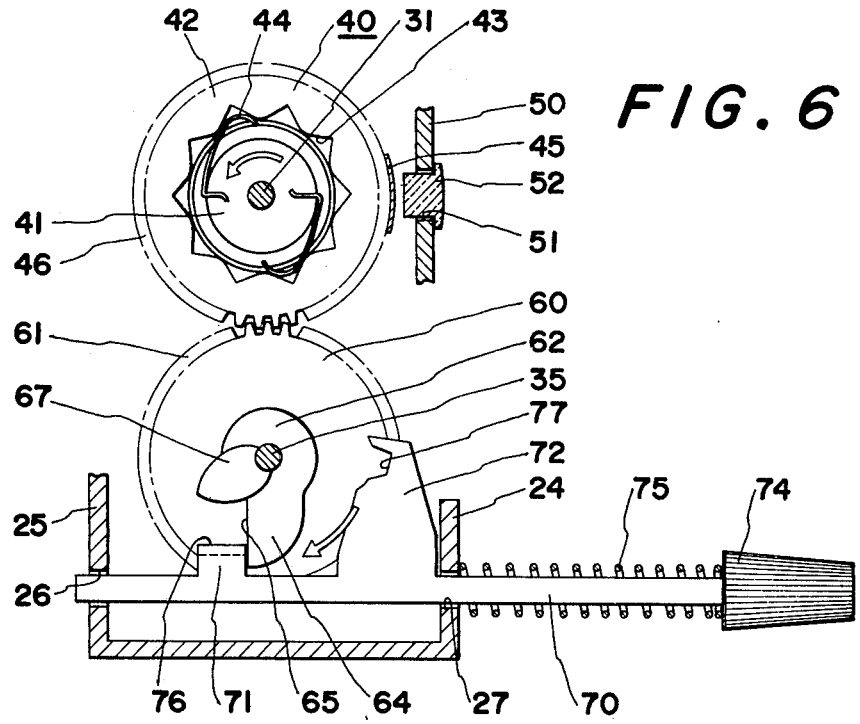
FIG. 6 is an enlarged, fragmentary vertical sectional view showing some essential parts of the display device of FIG. 5.
Figure 5:
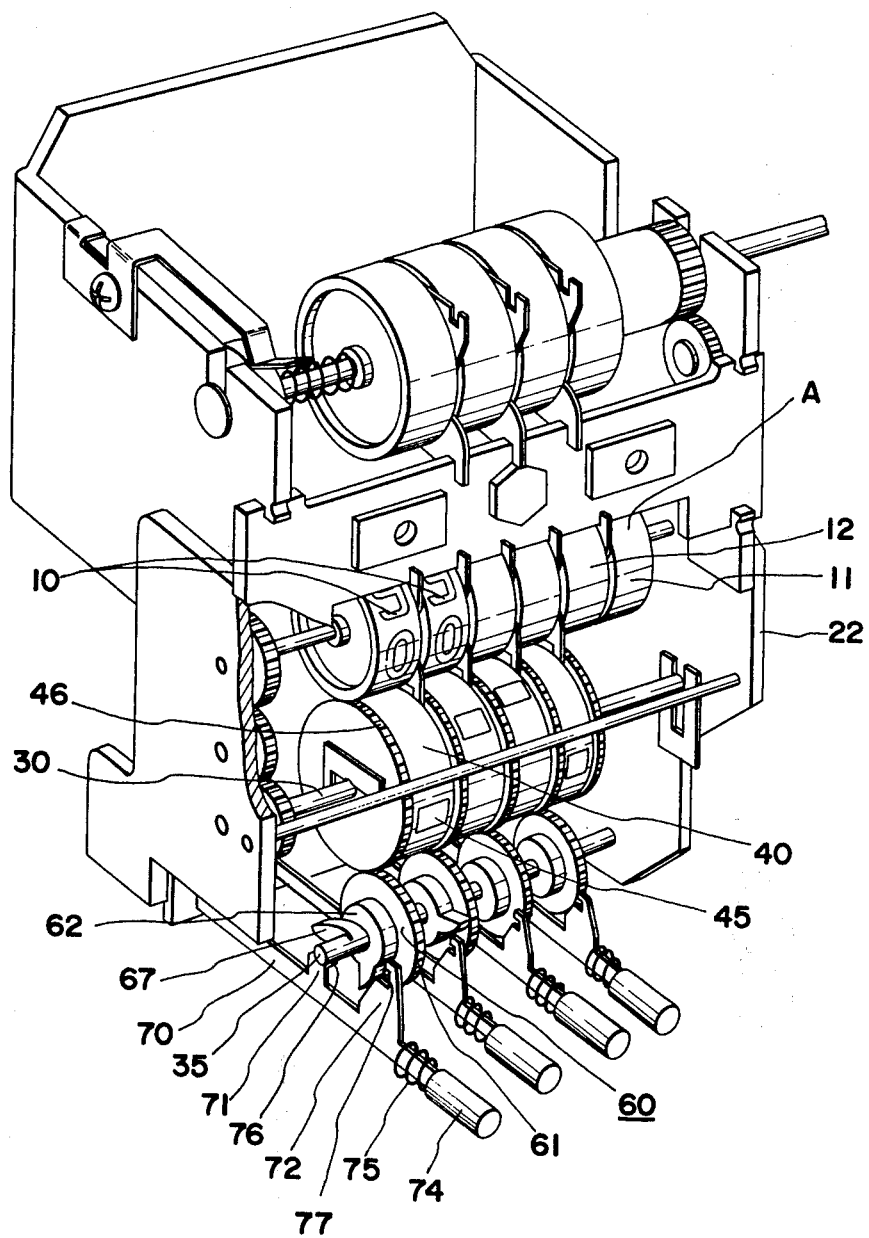
FIG. 5 is a perspective view, partly broken away, of another preferred embodiment of the invention.
Figure 7:
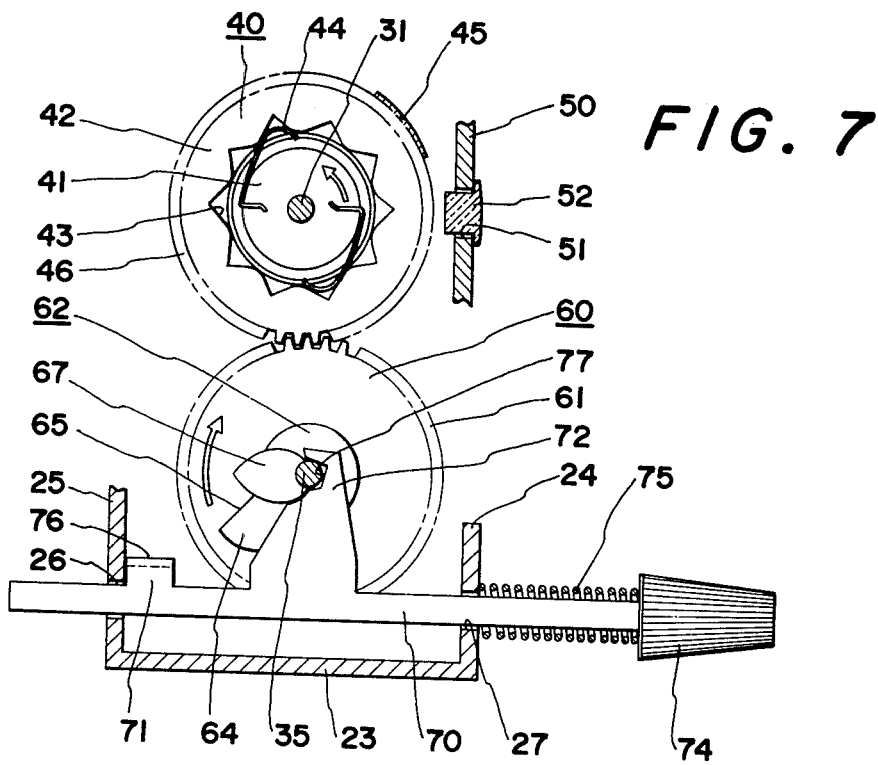
FIG. 7 is a view similar to FIG. 6 but explanatory of the resetting operation of the device.

FIGS. 5 to 7, inclusive, illustrate another preferred embodiment of the invention, which includes different means for resetting the display wheels. Unlike the preceding embodiment the display wheels can be reset before the warning zones thereon turn to the predetermined display positions. Such premature resetting of the display wheels often becomes necessary in practice, as when the items of vehicular maintenance are completed before the vehicle travels the specified distances. All the other parts and components of the display device, as well as the odometer for combined use therewith, are of exactly the same construction as the corresponding parts or components of the preceding embodiment and will therefore be not described in any detail.

As seen in both FIGS. 5 and 6, each locking gear 60 has not only the catch 64 but a cam 67 on one of its lateral faces. The catch 64 and cam 67 can be formed integral with the locking gear shaft 35, which is assumed to be rotatably supported at both ends, and the locking gear 60 is fixedly mounted on this rotatable shaft. It is important to note that the cam 67 is disposed farther away from the locking gear 60 than the catch 64. Both catch 64 and cam 67 extend radially from the locking gear shaft 35, with a prescribed angular spacing therebetween, and the cam 67 terminates short of the catch 64.

The reset rod 70 is slidably supported under the portion 62 of each locking gear 60 for reciprocation in its longitudinal direction. This reset rod has formed thereon stop 71 and trip 72 with a spacing therebetween. It should be noted that the reset rod 70 is disposed in vertical register with the cam 67, so that upon depression of the push button 74 on the front end of the reset rod, the trip 72 will move into contact with only the cam 67. The stop 71 has its top end portion 76 bent right-angularly toward the locking gear 60 for engaging the straight edge 65 of the catch 64 as the latter turns to the position of FIG. 6. In spite of the showing of FIG. 6 the other edge of the catch 64 may not necessarily be rounded, because that edge does not make contact with the trip 72 as in the preceding embodiment of the invention.

The trip 72 has its top end portion cammed out to provide a cam surface or edge 77 for mating engagement with the cam 67 inclusive of the locking gear shaft 35 constituting an integral part of the cam. The cam 67 and cam surface 77 are so shaped and sized relative to each other that upon depression of the push button 74, the corresponding display wheel 40 may be reset properly no matter what angular position the cam has been in with respect to the trip 72, as will be later explained in greater detail. The other details of construction are exactly as above described in connection with FIGS. 1 to 3.

As in the preceding embodiment the display wheels 40 jointly rotate in step with the preselected digit wheel 10 of the odometer A until the warning zone or zones on one or more of the display wheels turn to the display positions opposite the corresponding viewing windows 51. The outer member 42 of each such display wheel is then locked against rotation as the catch 64 on the corresponding locking gear 60 moves into abutting contact with the angled portion 76 of the stop 71 on the reset rod 70.

As the vehicle owner has performed the necessary inspection or servicing as suggested by the warning zone or zones now being exhibited, he may depress the corresponding push button or buttons 74. Thereupon, as shown in FIG. 7, the stop 71 on the reset rod 70 of each depressed push button disengages the catch 64, whereas the trip 72 engages the cam 67 with its cam surface 77 to cause the cam to turn through a predetermined angle with the locking gear 60, as indicated by the arrow in the drawing. As the outer member 42 of the corresponding display wheel 40 rotates with the locking gear 60 through the same angle, the warning zone 45 on the display wheel turns to its predetermined starting position.

In event the vehicle owner has completed the servicing of some vehicle part before the vehicle travels the specified distance, that is, before the warning zone 45 on the pertinent display wheel 40 turns to the display position, he may depress the corresponding push button 74 in the usual manner. Regardless of the angular position of the cam 67 the cam surface 77 of the trip 72 will then engage the same and will coact therewith to cause the locking gear 60 to turn, either clockwise or counterclockwise, to the position of FIG. 7. The display wheel can thus be reset properly.

In FIGS. 6 and 7 the clutch means between the inner and outer members 41 and 42 of each display wheel of this second embodiment is shown to be of the spring type. It will be evident, however that this spring-type clutch means is replaceble by the magnet-type clutch means shown in FIG. 4, or by any other equivalent means which normally connects the outer member 42 to the inner member 41 for simultaneous rotation therewith but which permits the inner member to rotate independently of the outer member when the latter is restrained from rotation.

Figure 8:
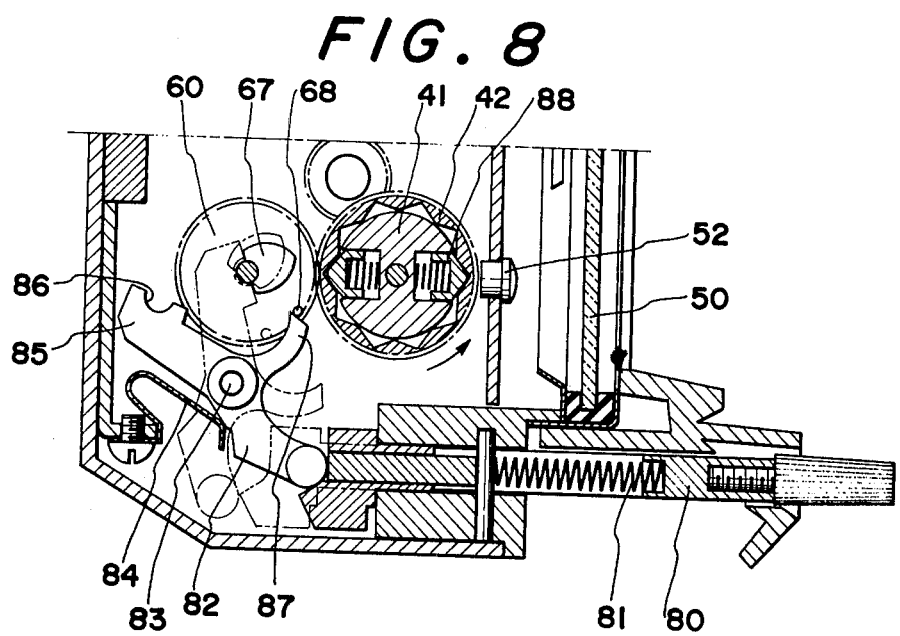
FIG. 8 is a fragmentary vertical sectional view showing a modification of the display device of FIG. 5.

FIG. 8 illustrates a modification of the preceding embodiment, which includes a reset rod 80 projecting forwardly of the dashboard 50 or the like and having a return spring in the form of a helical compression spring 81. The rear end of the reset rod 80 is opposed to one end of a substantially T-shaped level 82 pivotally supported at 83. This lever is urged to turn counterclockwise, as viewed in FIG. 8, as by a leaf spring 84, so that the said one end thereof abuts against the rear end of the reset rod 80.

The T-shaped lever 82 comprises arms 85 and 87 arranged approximately at a right angle with each other. The arm 85 has a cam surface or edge 86 at its end remote from the pivot 83 for mating engagement with the cam 67 previously explained with particular reference to FIG. 6. The other arm 87 serves as a stop, capable of engaging a catch pin 68 on the locking gear 60 to arrest the rotation of the display wheel outer member 42 when the warning zone thereon turns to the display position opposite the fisheye lens shown at 52.

FIG. 8 also illustrates a modified example of clutch means for disposition between the inner and outer members 41 and 42 of each display wheel. The modified clutch means includes one or more, two in the illustrated example, latch pins 88 that are mounted on the inner member 41 and spring biased into engagement in the notches 43 on the inside edge of the outer member 42. These latch pins are of course retractable against the biases of the springs when the outer member 42 is locked against rotation, thereby permitting the inner member 41 to rotate with the display wheel shaft.

When the warning zone on the illustrated display wheel turns to the display position the catch pin 68 on the locking gear 60 becomes engaged by the stop arm 87 of the T-shaped lever 82. The display wheel outer member 42 is then locked against rotation via the locking gear 60. However, since the latch pins 88 of the clutch means are retractable into the display wheel inner member 41, the latch continues rotation independently of the outer member.

Upon completion of the necessary inspection or servicing the operator may depress the push button on the reset rod 80 against the force of the return spring 81, thereby causing the T-shaped lever 82 to turn against the bias of the leaf spring 84 to the position indicated by the dot-and-dash lines in the drawing. The stop arm 87 of the lever now releases the pin 68 on the locking gear 60, whereas the other arm 85 of the lever engages the cam 67 with its cam surface 86 to cause the locking gear to rotate through a predetermined angle. The warning zone on the display wheel outer member 42 thus returns to its starting position. The other details of construction and operation are considered self-evident from the foregoing description.

While the various objects of this invention, either expressly stated or otherwise, are believed to have been fully accomplished in the preferred forms of the display device shown and described hereinbefore, it is also understood that the invention itself is not to be restricted by the exact showing of the drawings or the description thereof, as many modifications will readily occur to the specialists on the basis of this disclosure. It is therefore appropriate that the invention be construed broadly and in a manner consistent with the spirit and scope of the following claims.

What is claimed is:

1. In combination with a vehicle odometer including a set of digit wheels which are rotatable to register the distance traveled by the vehicle, a display device comprising:
   a. at least one display wheel having service information thereon and spaced from set of digital wheels, said display wheel including an inner member and an outer member, said outer member having a warning zone at a preselcted location on the peripheral surface thereof;
   b. means for imparting the rotation of a selected one of said set of digit wheels of said odometer to said inner member that is fixed on a shaft of said display wheel so that said display wheel shaft rotates in accordance with the distance traveled by the vehicle;
   c. clutch means normally connecting said inner member of said display wheel to said outer member to permit the latter to rotate with the former, said clutch means disconnecting said inner member from said outer member when the latter is locked against rotation;
   d. locking means coacting with stop means located on reset means for locking said outer member of said display wheel against rotation when said warning zone thereon turns to a predetermined display position; and
   e. said reset means coacting with means on the locking means and selectively to unlock said outer member of said display wheel and hence to permit the same to recommence rotation with said inner member.

2. A display device as set forth in claim 1, wherein said locking means comprises:
   a. a set of gear teeth on said outer member of said display wheel;
   b. a locking gear having teeth in constant mesh with said gear teeth on said outer member;
   c. a catch on said locking gear; and
   d. a stop for arresting the rotation of said locking gear by engaging said catch when said warning zone on said outer member of said display wheel turns to said display position.

3. A display device as set forth in claim 2, wherein said reset means comprises:
   a. a reset rod movable between a first and a second position relative to said locking gear, said reset rod being normally held in said first position;
   b. said stop being formed on said reset rod and being capable of engaging said catch on said locking gear when said reset rod is in said first position; and
   c. a trip also formed on said reset rod;
   d. whereby upon movement of said reset rod from said first to said second position, said stop disengages said catch while said trip causes said catch to turn through a predetermined angle with said locking gear, thereby causing said warning zone on said outer member of said display wheel to turn to a predetermined starting position.

4. A display device as set forth in claim 3, wherein said reset rod terminates at one end in a push button which is intended to be depressed manually to cause said reset rod to move from said first to said second position.

5. A display device as set forth in claim 1, wherein said clutch means comprises:
   a. at least one spring element affixed at one end to said inner member of said display wheel;
   b. said outer member of said display wheel having on its inside edge a series of notches adapted to releasably engage another end of said spring element.

6. A display device as set forth in claim 1, wherein said clutch means comprises:
   a. a plurality of spaced-apart pieces of magnetic material embedded in the circumference of said inner member of said display wheel; and
   b. at least one magnet embedded in said outer member of said display wheel to exert magnetic attraction on any adjacent one of said magnetic pieces.

7. A display device as set forth in claim 1, wherein said reset means includes means which, when said reset means is actuated before said outer member of said display wheel is locked against rotation by said locking means, causes said outer member to rotate until said warning zone thereon turns to a predetermined starting position.

8. A display device as set forth in claim 7, wherein said locking means comprises:
   a. a set of gear teeth on said outer member of said display wheel;
   b. a locking gear having teeth in constant mesh with said gear teeth on said outer member;
   c. a catch on said locking gear; and
   d. a stop for arresting the rotation of said locking gear by engaging said catch when said warning zone on said outer member of said display wheel turns to said display position; and wherein said reset means comprises:
   a. a cam on said locking gear;
   b. a reset rod movable between a first and a second position relative to said locking gear, said reset rod being normally held in said first position;
   c. said stop being formed on said reset rod and being capable of engaging said catch only when said reset rod is in said first position; and
   d. a trip also formed on said reset rod and having a cam surface for engagement with said cam upon movement of said reset rod from said first to said second position;
   e. whereby upon movement of said reset rod from said first to said second position, said cam surface of said trip coacts with said cam to cause said locking gear to rotate until said warning zone on said outer member of said display wheel turns to said starting position.

9. A display device as set forth in claim 7, wherein said locking means comprises:
   a. a set of gear teeth on said outer member of said display wheel;
   b. a locking gear having teeth in constant mesh with said gear teeth on said outer member;
   c. a catch on said locking gear; and
   d. a stop for arresting the rotation of said locking gear by engaging said catch when said warning zone on said outer member of said display wheel turns to said display position;

and wherein said reset means comprises:
   a. a cam on said locking gear;
   b. a lever pivotable between a first and a second position;

c. spring means for normally holding said lever in said first position;
d. means for causing said lever to pivot from said first to said second position against the force of said spring means;
e. said stop being formed on said lever and being capable of engaging said catch only when said lever is in said first position; and
f. a cam surface formed on said lever for engagement with said cam upon pivotal motion of said lever from said first to said second position;
g. whereby upon pivotal motion of said lever from said first to said second position, said cam surface of said lever coacts with said cam to cause said locking gear to rotate until said warning zone on said outer member of said display wheel turns to said starting position.

10. A display device as set forth in claim 1, wherein said clutch means comprises:
a. at least one retractable latch member projecting radially outwardly from said inner member of said display wheel; and
b. spring means biasing said latch member in the radially outward direction of said inner member;
c. said outer member of said display wheel having on its inside edge a series of notches adapted to releasably engage said latch member.

* * * * *